(12) United States Patent
Nagakari

(10) Patent No.: US 12,517,647 B2
(45) Date of Patent: Jan. 6, 2026

(54) PROVIDING USER INTERFACE FOR CONTROLLING A TOUCH SCREEN IN A VEHICLE USING MULTIPLE FINGER GESTURES

(71) Applicant: TOYOTA JIDOSHA KABUSHIKI KAISHA, Aichi-ken (JP)

(72) Inventor: Takahiro Nagakari, Koganei (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/673,233

(22) Filed: May 23, 2024

(65) Prior Publication Data

US 2025/0362797 A1 Nov. 27, 2025

(51) Int. Cl.
- G06F 3/0488 (2022.01)
- B60K 35/10 (2024.01)
- G06F 3/0484 (2022.01)

(52) U.S. Cl.
CPC ......... G06F 3/0488 (2013.01); B60K 35/10 (2024.01); G06F 3/0484 (2013.01); B60K 2360/1438 (2024.01); B60K 2360/146 (2024.01); G06F 2203/04808 (2013.01)

(58) Field of Classification Search
CPC ............ G06F 3/0488; G06F 3/0484; G06F 2203/04808; B60K 35/10; B60K 2360/1438; B60K 2360/146
See application file for complete search history.

(56) References Cited

U.S. PATENT DOCUMENTS

| | | | |
|---|---|---|---|
| 8,023,700 B2 * | 9/2011 | Riionheimo | G06F 3/04883 382/116 |
| 8,954,887 B1 * | 2/2015 | Tseng | G06F 3/04812 715/823 |
| 9,696,873 B2 | 7/2017 | Zhang et al. | |
| 9,720,591 B2 * | 8/2017 | Di Censo | G06F 3/0235 |
| 11,449,167 B2 * | 9/2022 | Yaron | H04W 4/80 |
| 2006/0284853 A1 * | 12/2006 | Shapiro | G06F 3/04883 345/173 |
| 2012/0069056 A1 | 3/2012 | Ito | |
| 2014/0160048 A1 * | 6/2014 | Conway | B60K 35/00 345/173 |
| 2015/0026586 A1 * | 1/2015 | Nylund | H04L 67/025 715/740 |
| 2015/0291032 A1 * | 10/2015 | Kim | B62D 1/04 280/779 |
| 2015/0360567 A1 | 12/2015 | Sannomiya et al. | |
| 2016/0004424 A1 | 1/2016 | Suzuki et al. | |
| 2016/0291862 A1 * | 10/2016 | Yaron | B60K 35/10 |

(Continued)

*Primary Examiner* — Bryan Earles
(74) *Attorney, Agent, or Firm* — HAUPTMAN HAM, LLP

(57) ABSTRACT

A multiple finger gesture user interface control is provided in a vehicle. A relationship between a predetermined function control and a predetermined multiple finger gesture using at least two fingers pressed on a touch screen for a predetermined time is set in advance. The predetermined multiple finger gesture is detected using the at least two fingers pressed on the touch screen for the predetermined time. A predetermined function control corresponding to the predetermined multiple finger gesture is generated. The multiple finger gestures are configured to provide input to a touch screen in a vehicle for executing functions or operations that are mapped to the multiple finger gestures.

20 Claims, 8 Drawing Sheets

(56) References Cited

U.S. PATENT DOCUMENTS

2016/0349850 A1\* 12/2016 Tsuda ..................... B60K 35/22
2017/0010799 A1\*  1/2017 Yaron ................. G06F 3/04883
2019/0212910 A1\*  7/2019 Abt ...................... G06F 3/0418
2024/0403877 A1\* 12/2024 Miller ................ G06Q 20/3263

\* cited by examiner

PROVIDING USER INTERFACE FOR CONTROLLING A TOUCH SCREEN IN A VEHICLE USING MULTIPLE FINGER GESTURES

TECHNICAL FIELD

This description relates to providing user interface for controlling a touch screen in a vehicle using multiple finger gestures.

BACKGROUND

Input/Output (I/O) is a process by which information is transmitted to a computer and the process by which the computer interacts with the physical world. Touch-based Input/Output (I/O) Interfaces are found on many types of devices, such as smartphones, tablets, and laptops, and have permeated aspects of daily life. For example, it is now common that a person organizes and conducts social interactions through applications on a smartphone or tablet. Further, businesses often rely on touch-based devices to communicate with employees, monitor jobs, and review project data, among any number of other uses.

Touch-based devices typically run touch-based operating systems, which inherently rely on touch-based inputs to control interaction with the operating systems. As useful and valuable as these devices are, they have the same limitation; at a primary level, they involve a user interacting manually directly with the device.

With the proliferation of the touch screen technology, interactive displays are becoming an integrated part of the modern vehicle environment. Today's vehicles include an increasing number of sensors, actuators and peripherals. A rapid increase in I/O is leading to high levels of complexity that uses new approaches to electrical and electronic architecture.

Common examples of human touch I/O allow occupants to turn up the heat, play music, adjust the seat position, roll down the windows, control vehicle components, and the like. However, due to road and driving conditions, the user input on such displays often results in erroneous selections and dangerous driving events. Many laws prohibit a driver from using hand-held devices while driving. Accordingly, devices with touch screens are often mounted near a driver. There are some cases that the touch screen is installed in the position where it is difficult for the driver to operate while driving. Further, having to look at a touch screen means a driver is not looking where they are going and is therefore dangerous. Thus, operating a device with a touch screen while driving may increase danger to a driver of a vehicle and other occupants of vehicles.

SUMMARY

In at least embodiment, a method for providing a multiple finger gesture user interface control in a vehicle includes registering a relationship between a predetermined function control and a predetermined multiple finger gesture using at least two fingers pressed on a touch screen for a predetermined time, detecting the predetermined multiple finger gesture using the at least two fingers pressed on the touch screen for the predetermined time, and generating a predetermined function control corresponding to the predetermined multiple finger gesture.

In at least one embodiment, a device for providing a multiple finger gesture user interface control in a vehicle includes a memory storing computer-readable instructions, and a processor connected to the memory, wherein the processor is configured to execute the computer-readable instructions to perform operations to register a relationship between a predetermined function control and a predetermined multiple finger gesture using at least two fingers pressed on a touch screen for a predetermined time, detect the predetermined multiple finger gesture using the at least two fingers pressed on the touch screen for the predetermined time, and generate a predetermined function control corresponding to the predetermined multiple finger gesture.

In at least one embodiment, a non-transitory computer-readable media having computer-readable instructions stored thereon, which when executed by a processor causes the processor to perform operations including registering a relationship between a predetermined function control and a predetermined multiple finger gesture using at least two fingers pressed on a touch screen for a predetermined time, detecting the predetermined multiple finger gesture using the at least two fingers pressed on the touch screen for the predetermined time, and generating a predetermined function control corresponding to the predetermined multiple finger gesture.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
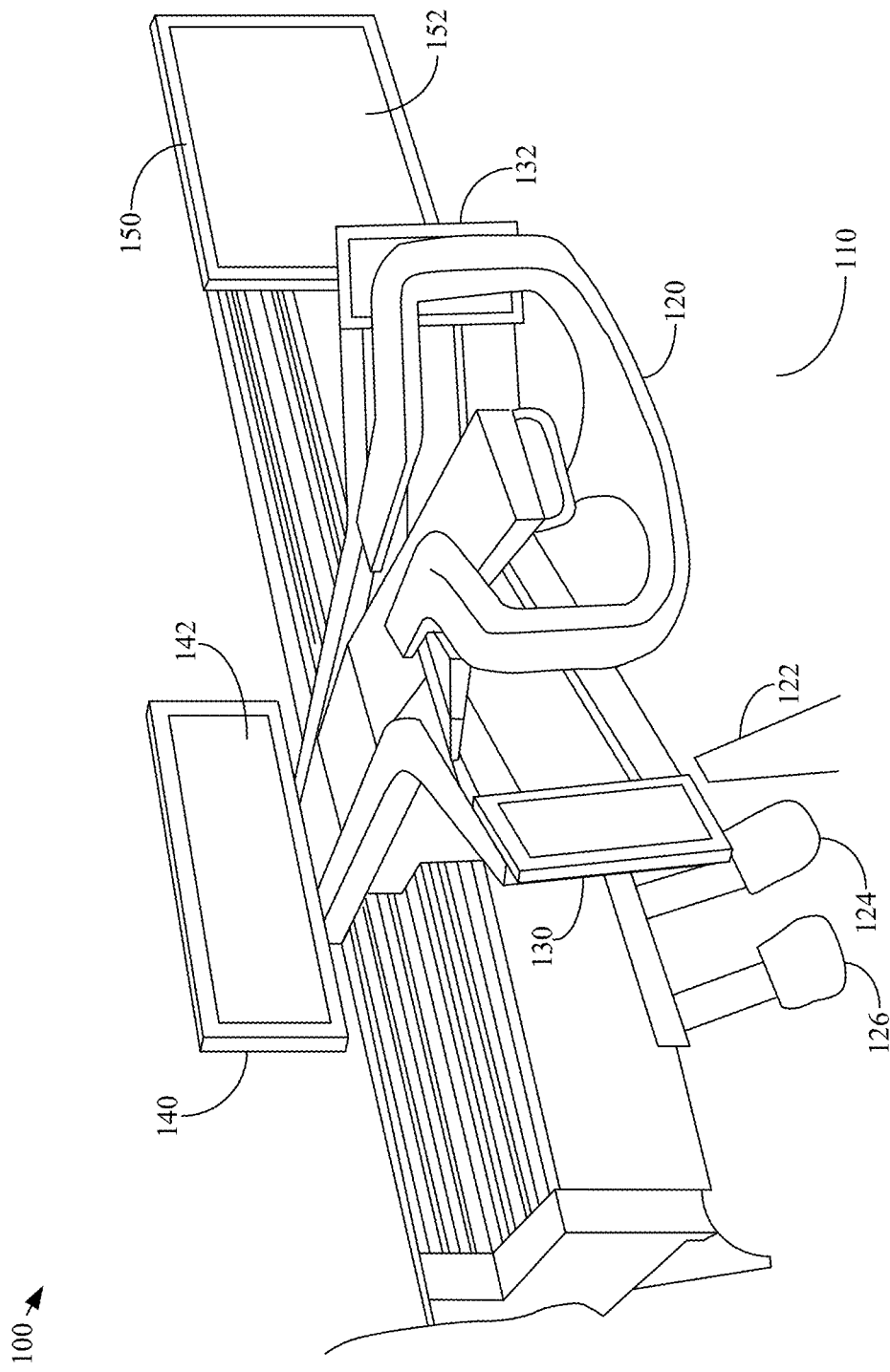
FIG. 1 shows a vehicle having Touch Screen Input/Output Devices according to at least one embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although the dependent claims listed below may directly depend on one claim, the disclosure of possible implementations includes the dependent claims in combination with every other claim in the claim set.

No element, act, or instruction used herein is to be construed as critical or essential unless explicitly described as such. Also, as used herein, the articles "a" and "an" are intended to include one or more items, and may be used interchangeably with "one or more." Where one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

The foregoing disclosure provides illustration and description but is not intended to be exhaustive or to limit the implementations to the precise form disclosed. Modifications and variations are possible in light of the above disclosure or may be acquired from practice of the implementations.

In at least one embodiment, a method for providing a multiple finger gesture user interface control in a vehicle includes registering a relationship between a predetermined function control and a predetermined multiple finger gesture using at least two fingers pressed on a touch screen for a predetermined time, detecting the predetermined multiple finger gesture using the at least two fingers pressed on the touch screen for the predetermined time, and generating a predetermined function control corresponding to the predetermined multiple finger gesture.

Embodiments described herein provide method that provides one or more advantages. For example, one or more predetermined multiple finger gestures are configured to provide input to a touch screen in a vehicle for executing functions or operations that are mapped to the multiple finger gestures. Thus, the multiple finger gestures provide easier function control without causing the driver to become distracted.

FIG. 1 shows a vehicle 100 having Touch Screen Input/Output Devices according to at least one embodiment.

In FIG. 1, the vehicle 100 includes a Vehicle Cockpit 110. The Vehicle Cockpit 100 is an area where a driver or operator of the vehicle is positioned for driving the vehicle 100. The Vehicle Cockpit 100 includes Steering Wheel 120, Accelerator Pedal 122, Brake Pedal 124, and Clutch 126. A Left Touch Screen 130 is positioned to the left of Steering Wheel 120, and a Right Touch Screen 132 is positioned to the right of Steering Wheel 120. The Left Touch Screen 130 and the Right Touch Screen 132 are able to control different functions or different aspects of the same function.

A Heads-Up Display 140 is position distally from Steering Wheel 120 closer to Windshield 150. Heads-Up Display 140 may be a part of Windshield 150. Heads-Up Display 140 includes Touch Screen 142 for displaying an Instrument Cluster (IC). Touch Screen 142 is capable of showing the velocity of the vehicle (e.g., referred to as speedometer), the Revolutions Per Minute (RPM) denoting the number of rotations of the vehicle's crankshaft per minute (e.g., referred to as tachometer), the distance traveled by the vehicle (e.g., referred to as odometer), a measure of the oil pressure in the vehicle (e.g., referred to as an oil pressure gauge), a measure of the fuel in the vehicle (e.g., referred to as a fuel gauge), various indicators for system malfunctions and warnings, and the like. Heads-Up Display 140 is capable of using an analog display or a digital display, wherein a digital Heads-Up Display 140 is able to be customizable via user input to a touch screen of the Heads-Up Display 140. Other information and arrangements are able to be implemented according to at least one embodiment.

An In-Vehicle Infotainment (IVI) System 150 is shown further to the right of Heads-Up Display 140. IVI System 150 is often referred simply to Infotainment System or Information System. IVI System 150 includes Touch Screen 152. IVI System 150 is a central digital system that allows the user to control a wide variety of vehicle functions. IVI System 150 is also able to connect with certain devices, such as smartphones, inside the vehicle. IVI System 150 is capable of providing features and functions including at least one of hands-free calling, music players and radio functions, Global Positioning System (GPS) navigation, weather updates, traffic alerts, climate control, rear camera display, vehicle performance data, Internet connectivity, and the like.

However, operation of Left Touch Screen 130, Right Touch Screen 132, Touch Screen 142 of Heads-Up Display 140, Touch Screen 152 of IVI System 150, and the like is difficult when the user is driving the vehicle. Accordingly, in embodiments described herein, one or more predetermined multiple finger gestures are implemented to provide easier function control without causing the driver to become distracted.

Figure 2:
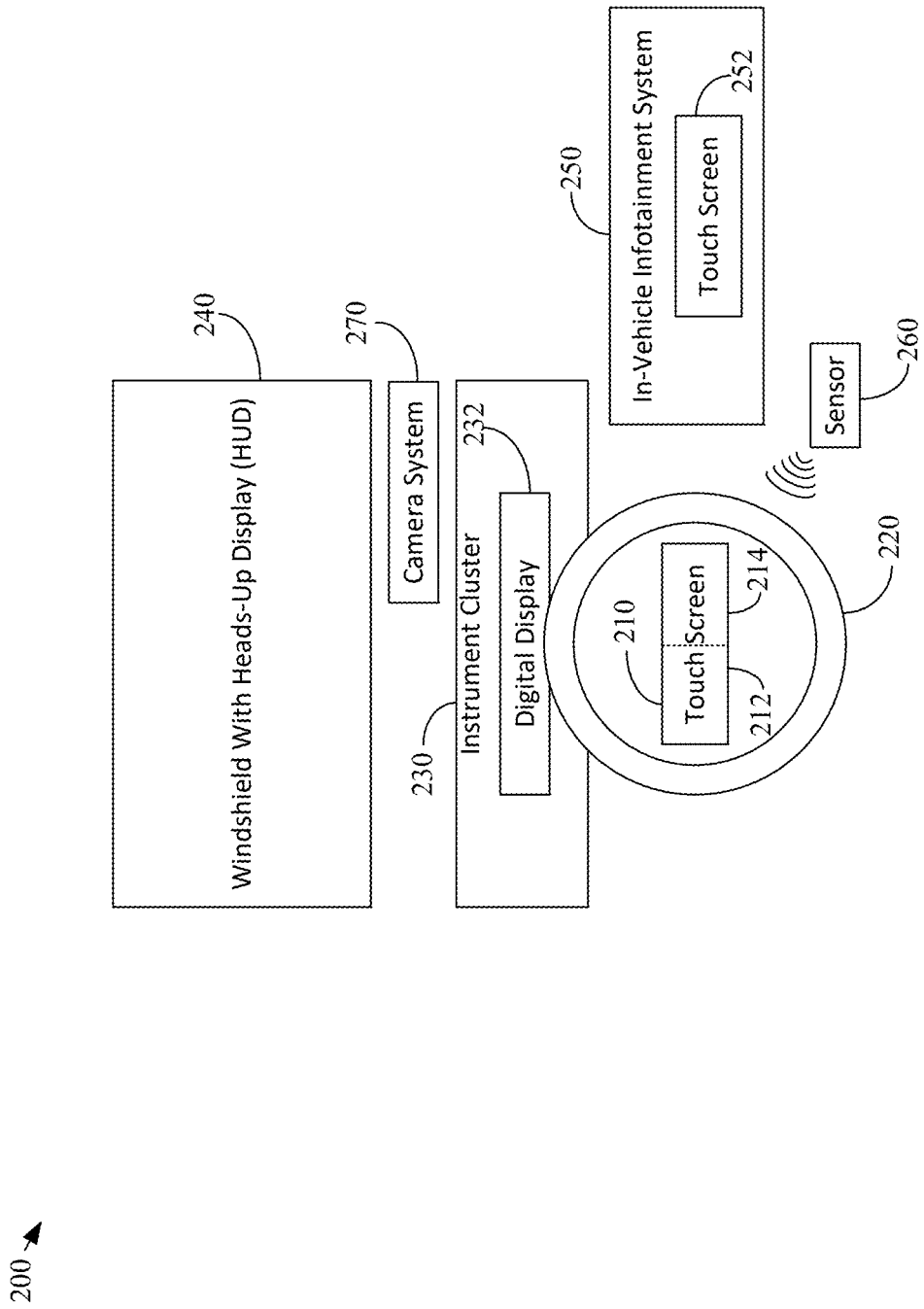
FIG. 2 is a front view of a Second Vehicle Cockpit according to at least one embodiment.

FIG. 2 is a front view of a Second Vehicle Cockpit 200 according to at least one embodiment.

In FIG. 2, in Second Vehicle Cockpit 200, a Touch Screen 210 is positioned in the center of Steering Wheel 220. Touch Screen 210 is able to be configured as a single display or a Left Touch Screen 212 and Right Touch Screen 214. Those skilled in the art understand that other configurations are able to be implemented according to embodiments described herein.

An Instrument Cluster (IC) 230 is positioned in front of Steering Wheel 220. Instrument Cluster 230 is able to be implemented with analog gauges or Digital Display 232. Furthermore, Instrument Cluster 230 is able to be configured to provide information as described above with reference to FIG. 1 regardless of whether Instrument Cluster 230 is implemented with analog gauges or a Digital Display 232.

A Windshield With Heads-Up Display (HUD) 240 is provided in view of the driver. Windshield With HUD 240 shows the information directly in the driver's field of view, providing information, such as speed, warning signals and intuitive guidance for navigation, without the driver looking down to the Instrument Cluster 230. There are different types of Windshield With HUD 240.

An In-Vehicle Infotainment (IVI) System 250 is shown to the right of Steering Wheel 220.

IVI System 250 is often referred simply to Infotainment System or Information System. IVI System 150 includes Touch Screen 252. As described above, IVI System 250 is a central digital system that allows the user to control a wide variety of vehicle functions. IVI System 250 is also able to connect with certain devices, such as smartphones, inside the vehicle. IVI System 250 is capable of providing features and functions including at least one of hands-free calling, music players and radio functions, Global Positioning System (GPS) navigation, weather updates, traffic alerts, climate control, rear camera display, vehicle performance data, Internet connectivity, and the like.

However, as described above with reference to FIG. 1, operation of Touch Screen 210, Instrument Cluster 230 with Digital Display 232, and Windshield With HUD 240, and the like is difficult when the user is driving the vehicle. Accordingly, in embodiments described herein, one or more predetermined multiple finger gestures are implemented to provide easier function control without causing the driver to become distracted.

According to at least one embodiment, at least one Sensor 260 detects the position of the steering wheel and thus determines the steering wheel is being turned beyond a predetermined amount. The operation of the multiple finger gesture commands is invalid when the driver turns a steering wheel by more than a predetermined angle. Thus, the driver is able to be prevented from performing the multiple finger command gestures in an unsafe manner. A slight movement does not result in a determination of using multiple finger command gestures being a dangerous maneuver. Alternatively, rather than using Sensor 260 to detect a turning of the steering wheel in excess of a predetermined amount, Camera System 270 is able to determine an angle of the vehicle relative to the road and is also able to render a multiple finger command gesture as being invalid. Also, the touch screen is able to be disabled for displaying visual interactions when the vehicle is moving. In response to the vehicle stopping, the visual interactions are restored to the touch screen and at that point the multiple finger command gestures are able to be disabled or to not be recognized.

Figure 3:
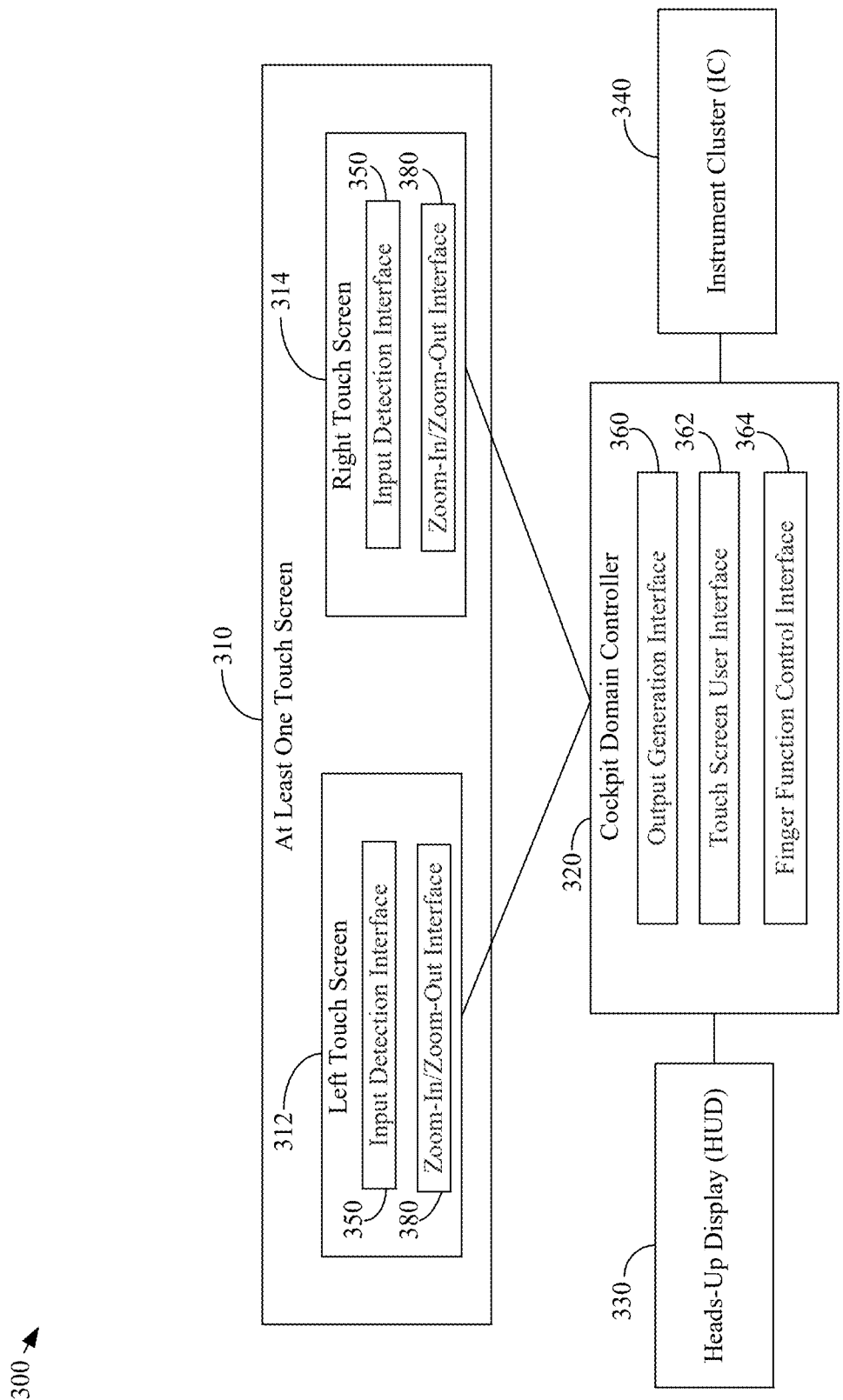
FIG. 3 is a block diagram of a Multiple Finger Gesture System according to at least one embodiment.

FIG. 3 is a block diagram of a Multiple Finger Gesture System 300 according to at least one embodiment.

In FIG. 3, Multiple Finger Gesture System 300 includes at least one Touch Screen 310 in a vehicle. According to at least one embodiment, a Left Touch Screen 312 and a Right Touch Screen 314 are provided. A Cockpit Domain Controller 320 is coupled to Left Touch Screen 312 and Right Touch Screen 314.

Cockpit Domain Controller 320 stores and recognizes multiple finger gesture operations according to at least one embodiment. Cockpit Domain Controller 320 translates a predetermined multiple finger gesture to a function control just as a touch of a button on an application interface. Cockpit Domain Controller 320 outputs the operation performed on Left Touch Screen 312 and Right Touch Screen 314.

The Multiple Finger Gesture System 300 is also able to include a Heads Up Display (HUD) 330 and an Instrument Cluster (IC) 340, which may have a digital information overlay for displaying additional information as selected by the user. The actual application interface that recognizes multiple finger gestures is not shown on the HUD 330 or on the IC 340.

Left Touch Screen 312 and Right Touch Screen 314 include an Input Detection Interface 350 configured to detect a predetermined multiple finger operation by a driver of the vehicle that is sent to Cockpit Domain Controller 320. According to at least one embodiment, a single finger touch to a touch screen is excluded because a single touch is too common and is able to result in an imprecise action. Cockpit Domain Controller 320 includes an Output Generation Interface 360 that is configured to generate a predetermined output corresponding to multiple finger gesture operations. The output from multiple finger gesture operations is predetermined by Output Generation Interface 360 of Cockpit Domain Controller 320, and provides an operation other than in response to a single finger touch gesture. The Output Generation Interface 360 of Cockpit Domain Controller 320 allows the driver to safely operate an I/O device using multiple finger gestures without reducing attention of the driver while driving the vehicle.

A driver is able to initiate a Finger Function Control Interface 364 through Touch Screen User Interface 362 provided by Cockpit Domain Controller 320 to set up predetermined multiple finger gesture operations mapped to multiple finger gestures. In at least one embodiment, Finger Function Control Interface 364 is configured to present candidates for the predetermined multiple finger gesture operations to the driver. Touch Screen User Interface 362 of Cockpit Domain Controller 320 controls operations of the at least one Touch Screen 310. A driver is able to use Input Detection Interface 350 of at least Left Touch Screen 312 and Right Touch Screen 314 to access the Finger Function Control Interface 364 to assign an action to a function control.

Finger Function Control Interface 364 provided by Cockpit Domain Controller 320 is able to be used to map a long push using two or more fingers applied to Left Touch Screen 312 and Right Touch Screen 314, e.g., for several seconds, to associate a function control with the long touch using two or more fingers. For example, a predetermined gesture according to at least one embodiment includes a long push using two fingers for a predetermined time combined with a vertical movement and then a horizontal movement. Alternatively, or in addition to the long push with two fingers and vertical/horizontal gesture, a predetermined gesture according to at least one embodiment includes a long push using two fingers for a predetermined time, a long push by three fingers for a predetermined time, a long push by four fingers for a predetermined time, and a long push by five fingers for a predetermined time. Finger Function Control Interface 364 is able to be used by a user to configure the period of long push, and to assign an action to a function control.

Finger Function Control Interface 364 is able to be used by a user to configure double touches using multiple fingers within a few, and to associate such double touches with a function control. For example, additional gestures include double touches by two fingers within a predetermined time, double touches by three fingers within a predetermined time, double touches by four fingers within a predetermined time, and double touches by five fingers within a predetermined time. Finger Function Control Interface 364 is able to be used by a user to configure the period of double touches, and is able to assign an action to a function control.

Thus, the predetermined multiple finger operation is an operation using two or more fingers. The relationship between the finger operation and the predetermined output is able to be defined by the driver through the Touch Screen User Interface 362. The Touch Screen User Interface 362 presents the Finger Function Control Interface 364 to enable the user to configure candidates of the multiple finger gesture operations. Generating the predetermined output includes displaying the Finger Function Control Interface 364 on the touch screen of the output device for enabling multiple finger command gestures. A Zoom-In/Zoom-Out Interface 380 of Left Touch Screen 312 and Right Touch Screen 314 enables a user to enlarge/zoom-in by a pinch-out operation on one or more of Left Touch Screen 312 and Right Touch Screen 314, and to reduce/zoom-out by a pinch-in operation on one or more of Left Touch Screen 312 and Right Touch Screen 314, in particular when the screen is displayed on Heads-Up display 330. If the screen is displayed on the IC, the above pinch-out and pinch-in functions are able to be disabled.

The at least one Touch Screen 310 in the vehicle, e.g., Left Touch Screen 312 and Right Touch Screen 314, that is built into the vehicle is not associated with a touch screen of a user device, such as a smartphone. The at least one Touch Screen 310 is positioned so that the driver is able to use the touch screen without removing the driver's hands from the steering wheel or without the driver's eyes being diverted from concentrating on the road. Also, at least one Touch Screen 310 is positioned so that the touch screen faces the driver.

Figure 4:
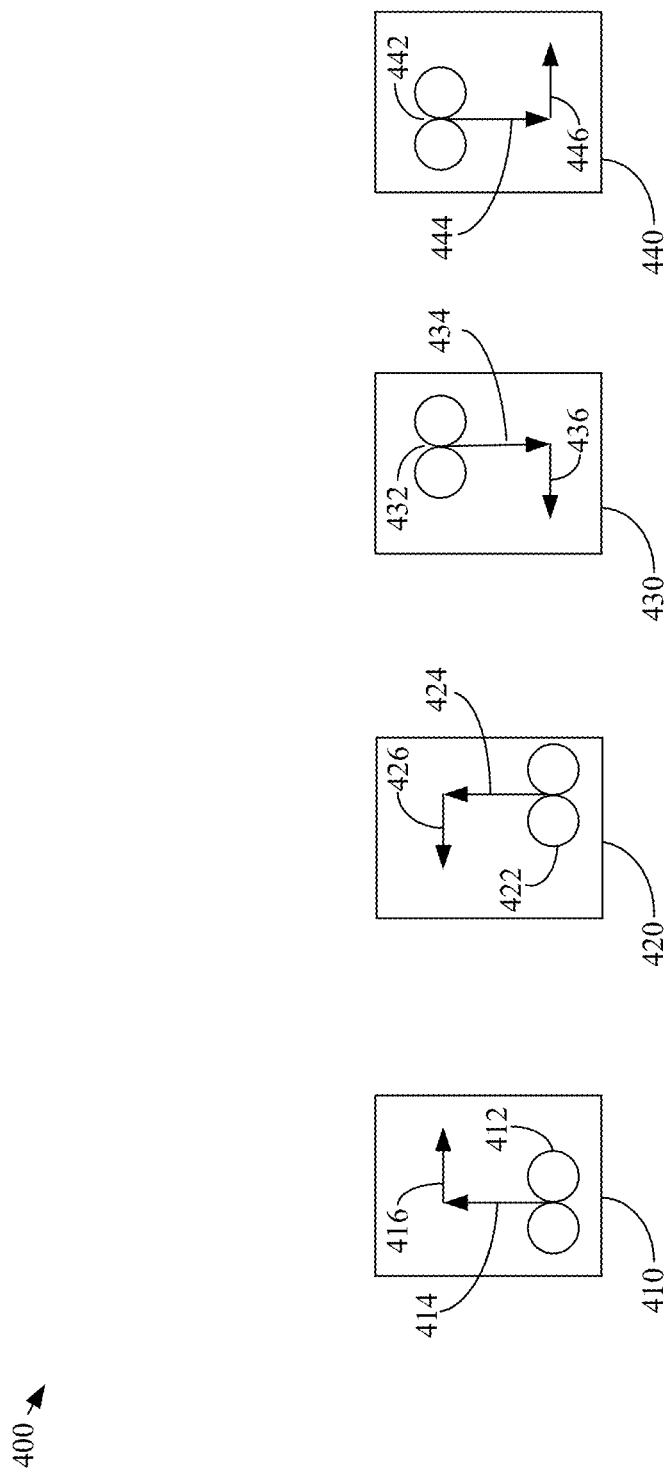
FIG. 4 illustrates a first type of multiple finger gestures according to at least one embodiment.

FIG. 4 illustrates a first type of multiple finger gestures 400 according to at least one embodiment.

In FIG. 4, a first predetermined multiple finger gesture 410 according to at least one embodiment includes a long push using two fingers 412 for a predetermined time combined with an upward vertical movement 414 and then a rightward horizontal movement 416.

A second predetermined multiple finger gesture 420 according to at least one embodiment includes a long push using two fingers 422 for a predetermined time combined with an upward vertical movement 424 and then a leftward horizontal movement 426.

A third predetermined multiple finger gesture 430 according to at least one embodiment includes a long push using two fingers 432 for a predetermined time combined with a downward vertical movement 434 and then a leftward horizontal movement 436.

A fourth predetermined multiple finger gesture 440 according to at least one embodiment includes a long push using two fingers 442 for a predetermined time combined with a downward vertical movement 444 and then a rightward horizontal movement 446.

Those skilled in the art recognize that the horizontal movement is able to be performed first after the long push using two fingers followed by the vertical movement.

Further, those skilled in the art recognize that a diagonal movement is able to be used instead of a vertical/horizontal combination movement. Other first types of multiple finger gesture 400 are able to use curved motions rather than linear motions. Three finger, four finger and five finger pushes are able to be used as an alternative to the two finger pushes in combination with a predetermined motion. The long touches indicated to the Cockpit Domain Controller 320, as described with reference to FIG. 3, that a multiple finger gesture command is being triggered. The multiple finger gestures 410, 420, 430, 440 are able to be mapped to functions or operations using Finger Function Control Interface 364 through Touch Screen User Interface 362 provided by Cockpit Domain Controller 320 as described with reference to FIG. 3.

Figure 5:
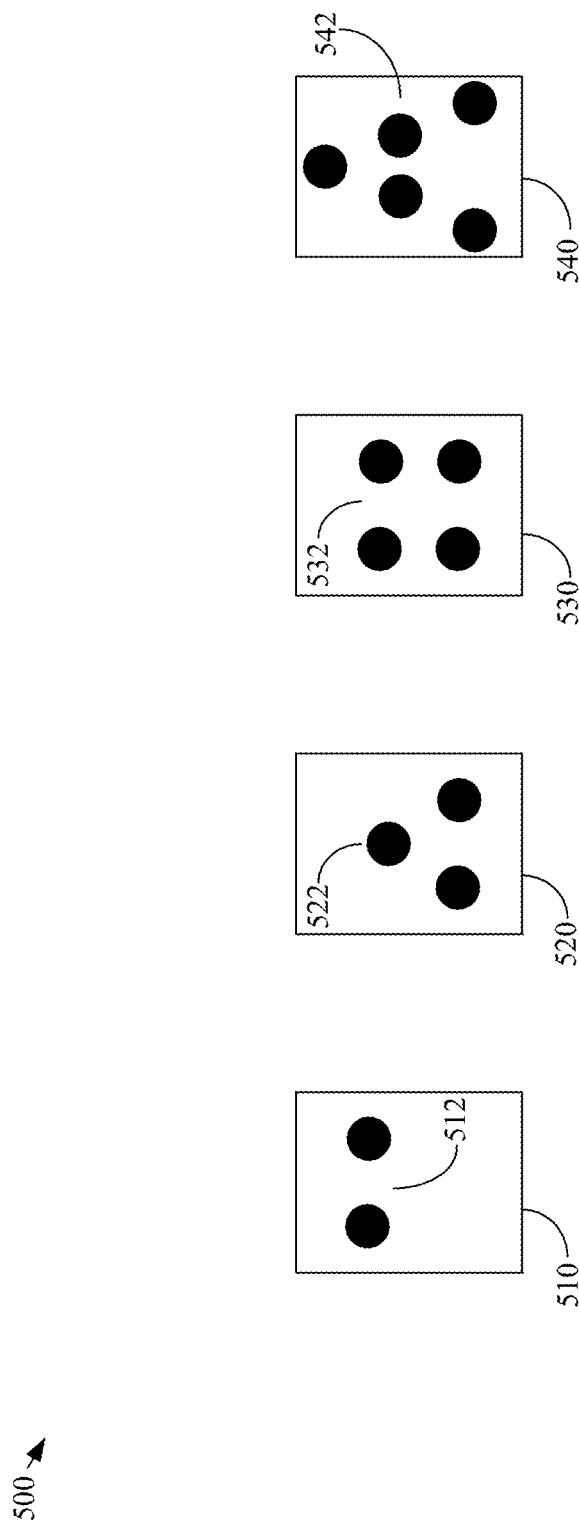
FIG. 5 illustrates a second type of multiple finger gestures according to at least one embodiment.

FIG. 5 illustrates a second type of multiple finger gestures 500 according to at least one embodiment.

In FIG. 5, a first predetermined multiple finger gesture 510 involves a long push using two fingers 512 for a predetermined time. A second predetermined multiple finger gesture 520 involves a long push using three fingers 522 for a predetermined time. A third predetermined multiple finger gesture 530 involves a long push using four fingers 532 for a predetermined time. A fourth predetermined multiple finger gesture 540 involves a long push using five fingers 542 for a predetermined time. As described with reference to FIG. 3, Finger Function Control Interface 364 is able to be used by a user to configure the period of long push with multiple fingers, and to assign an action to a function control. Those skilled in the art recognize that the arrangement of the finger touches are presented for illustration and that other configurations using two, three, four, and five fingers are able to be used without departing from the embodiments described herein.

Figure 6:
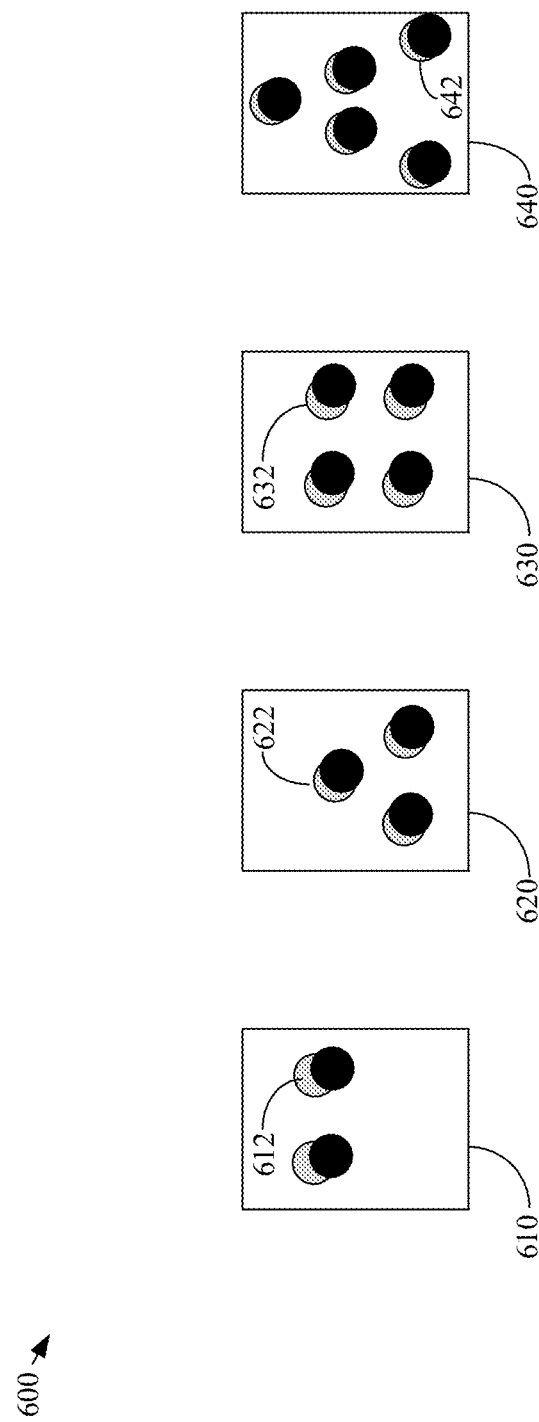
FIG. 6 illustrates a third type of multiple finger gestures according to at least one embodiment.

FIG. 6 illustrates a third type of multiple finger gestures 600 according to at least one embodiment.

In FIG. 6, a first predetermined multiple finger gesture 610 includes a double touch by two fingers 612 within a predetermined time. A second predetermined multiple finger gesture 620 includes a double touch by three fingers 622 within a predetermined time. A third predetermined multiple finger gesture 630 includes a double touch by four fingers 632 within a predetermined time. A fourth predetermined multiple finger gesture 640 includes a double touch by five fingers 642 within a predetermined time. As described with reference to FIG. 3, Finger Function Control Interface 364 is able to be used by a user to configure the period of double touches, and is able to assign an action to a function control. Those skilled in the art recognize that the arrangement of the fingers for double touches are presented for illustration and that other configurations using two, three, four, and five finger double touches are able to be used without departing from the embodiments described herein.

Figure 7:
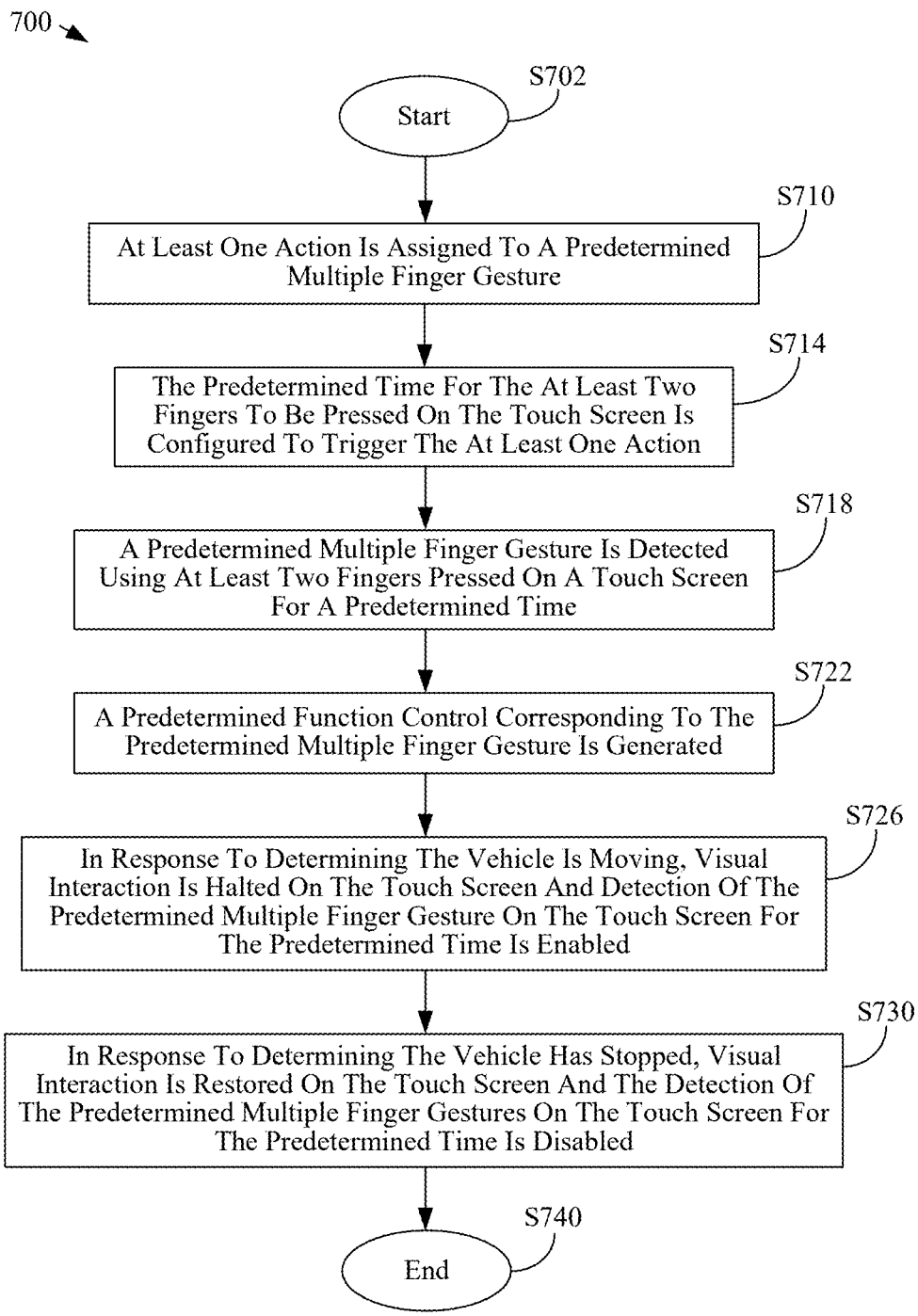
FIG. 7 is a flowchart of a method for providing user interface control via a touch screen in a vehicle according to at least one embodiment.

FIG. 7 is a flowchart 700 of a method for providing user interface control via a touch screen in a vehicle according to at least one embodiment.

In FIG. 7, the process starts S702 and then at least one action is assigned to a predetermined multiple finger gesture S710. Referring to FIG. 3, a driver is able to initiate a Finger Function Control Interface 364 through Touch Screen User Interface 362 provided by Cockpit Domain Controller 320. Predetermined multiple finger gesture operations mapped to multiple finger gestures are registered. In at least one embodiment, Finger Function Control Interface 364 is configured to present candidates for the predetermined multiple finger gesture operations to the driver. Touch Screen User Interface 362 of Cockpit Domain Controller 320 controls operations of the at least one Touch Screen 310. A driver is able to use Input Detection Interface 350 of at least Left Touch Screen 312 and Right Touch Screen 314 to access the Finger Function Control Interface 364 to assign an action to a function control.

The predetermined time for the at least two fingers to be pressed on the touch screen to trigger the at least one action is configured by the user S714. Referring to FIG. 3, Finger Function Control Interface 364 provided by Cockpit Domain Controller 320 is able to be used to map a long push using two or more fingers applied to Left Touch Screen 312 and Right Touch Screen 314, e.g., for several seconds, to associate a function control with the long touch using two or more fingers. For example, a predetermined gesture according to at least one embodiment includes a long push using two fingers for a predetermined time combined with a vertical movement and then a horizontal movement.

A predetermined multiple finger gesture using at least two fingers pressed on a touch screen for a predetermined time is detected S718. Referring to FIG. 3, Left Touch Screen 312 and Right Touch Screen 314 include an Input Detection Interface 350 configured to detect a predetermined multiple finger operation by a driver of the vehicle that is sent to Cockpit Domain Controller 320. According to at least one embodiment, the detecting the predetermined multiple finger gesture includes detecting a predetermined multiple finger gesture including a push using multiple fingers for the predetermined time combined with a predetermined motion. According to at least one embodiment, the detecting the predetermined multiple finger gesture includes detecting a predetermined multiple finger gesture involving at least one of a push using two fingers for the predetermined time, a push by three fingers for the predetermined time, a push by four fingers for the predetermined time, or a push by five fingers for the predetermined time. According to at least one embodiment, the detecting the predetermined multiple finger gesture using two or more fingers pressed on the touch screen for the predetermined time by the driver of the vehicle includes detecting a double touch using multiple fingers within a time limit. According to at least one embodiment, the detecting the predetermined multiple finger gesture using two or more fingers pressed on the touch screen for the predetermined time by the driver of the vehicle includes rendering the predetermined output corresponding to the finger operation invalid in response to at least one of the driver turning a steering wheel or detecting an angle of the vehicle exceeding a predetermined angle on the road.

A predetermined function control corresponding to the predetermined multiple finger gesture is generated based on detecting predetermined multiple finger gesture using at least two fingers pressed on a touch screen for a predetermined time S722. Referring to FIG. 3, Cockpit Domain Controller 320 includes an Output Generation Interface 360 that is configured to generate a predetermined output corresponding to multiple finger gesture operations. The output from multiple finger gesture operations is predetermined by Output Generation Interface 360 of Cockpit Domain Controller 320, and provides an operation other than in response to a single finger touch gesture. The Output Generation Interface 360 of Cockpit Domain Controller 320 allows the driver to safely operate an I/O device using multiple finger gestures without reducing attention of the driver while driving the vehicle.

In response to determining the vehicle is moving, visual interaction on the touch screen is halted and detection of the predetermined multiple finger gesture on the touch screen for the predetermined time is enabled S726. Referring to FIG. 2, the touch screen is able to be disabled for displaying visual interactions when the vehicle is moving.

In response to determining the vehicle has stopped, visual interaction is restored on the touch screen and the detection of the predetermined multiple finger gestures on the touch screen for the predetermined time is disabled S730. Referring to FIG. 2, in response to the vehicle stopping, the visual interactions are restored to the touch screen and at that point the multiple finger command gestures are able to be disabled or to not be recognized.

The process then terminates S740.

In at least one embodiment, a method for providing a multiple finger gesture user interface control in a vehicle includes registering a relationship between a predetermined function control and a predetermined multiple finger gesture using at least two fingers pressed on a touch screen for a predetermined time, detecting the predetermined multiple finger gesture using the at least two fingers pressed on the touch screen for the predetermined time, and generating a predetermined function control corresponding to the predetermined multiple finger gesture. Embodiments described herein provide method that provides one or more advantages. For example, one or more predetermined multiple finger gestures are configured to provide input to a touch screen in a vehicle for executing functions or operations that are mapped to the multiple finger gestures. Thus, the multiple finger gestures provide easier function control without causing the driver to become distracted.

Figure 8:
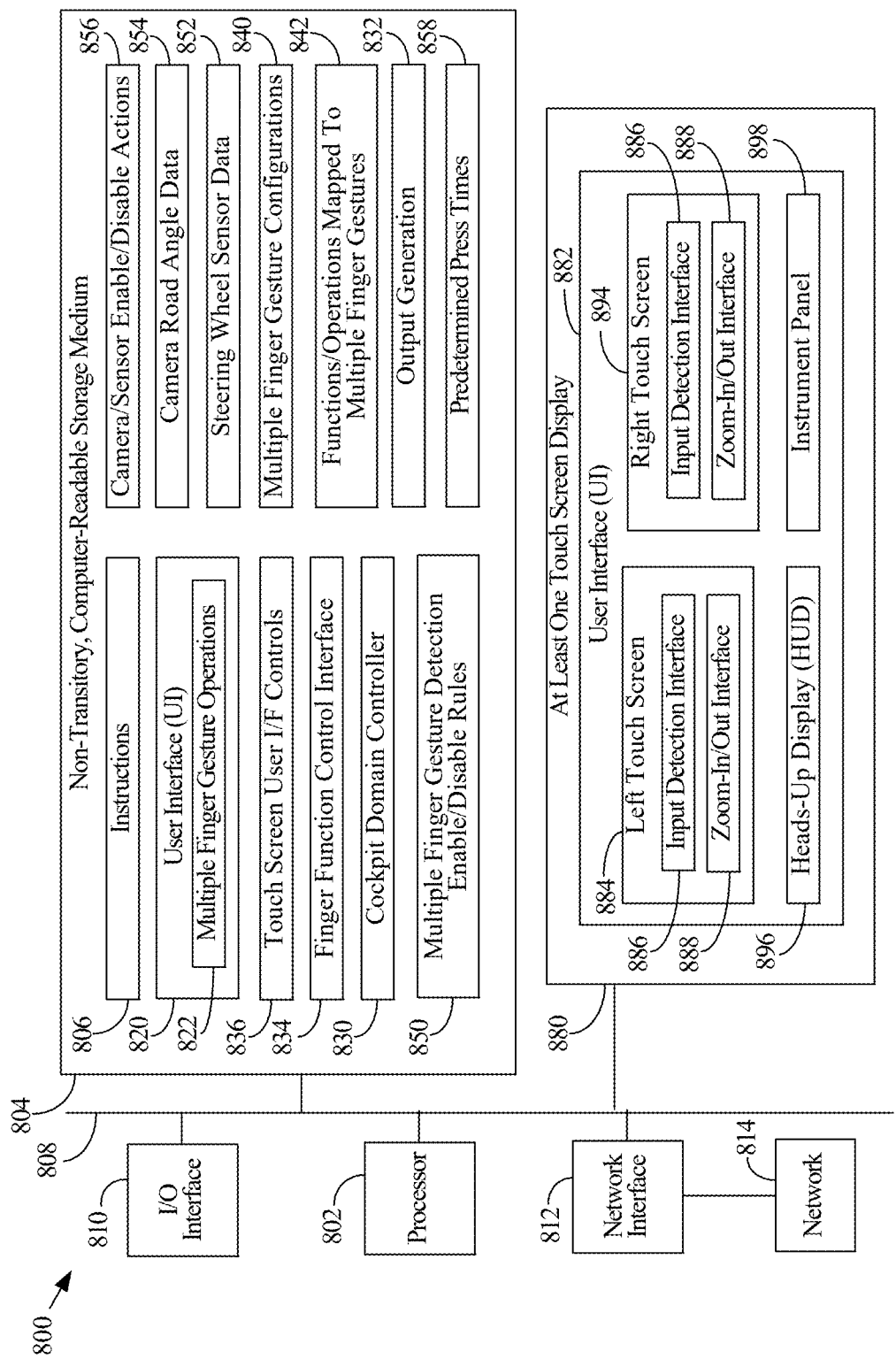
FIG. 8 is a high-level functional block diagram of a processor-based system according to at least one embodiment.

FIG. 8 is a high-level functional block diagram of a processor-based system 800 according to at least one embodiment.

In at least one embodiment, processing circuitry 800 provides a method for providing user interface control via a touch screen in a vehicle. Processing circuitry 800 implements a method for providing user interface control via a touch screen in a vehicle using Processor 802. Processing circuitry 800 also includes a Non-Transitory, Computer-Readable Storage Medium 804 that is used to implement a method for providing user interface control via a touch screen in a vehicle. Non-Transitory, Computer-Readable Storage Medium 804, amongst other things, is encoded with, i.e., stores, Instructions 806, i.e., computer program code, that are executed by Processor 802 causes Processor 802 to perform operations for providing user interface control via a touch screen in a vehicle. Execution of Instructions 806 by Processor 802 represents (at least in part) an application which implements at least a portion of the methods described herein in accordance with one or more embodiments (hereinafter, the noted processes and/or methods).

Processor 802 is electrically coupled to Non-Transitory, Computer-Readable Storage Medium 804 via a Bus 808. Processor 802 is electrically coupled to an Input/Output (I/O) Interface 810 by Bus 808. A Network Interface 812 is also electrically connected to Processor 802 via Bus 808. Network Interface 812 is connected to a Network 814, so that Processor 802 and Non-Transitory, Computer-Readable Storage Medium 804 connect to external elements via Network 814. Processor 802 is configured to execute Instructions 806 encoded in Non-Transitory, Computer-Readable Storage Medium 804 to cause processing circuitry 800 to be usable for performing at least a portion of the processes and/or methods. In one or more embodiments, Processor 802 is a Central Processing Unit (CPU), a multi-processor, a distributed processing system, an Application Specific Integrated Circuit (ASIC), and/or a suitable processing unit.

Processing circuitry 800 includes I/O Interface 810. I/O interface 810 is coupled to external circuitry. In one or more embodiments, I/O Interface 810 includes a keyboard, keypad, mouse, trackball, trackpad, touchscreen, and/or cursor direction keys for communicating information and commands to Processor 802.

Processing circuitry 800 also includes Network Interface 812 coupled to Processor 802. Network Interface 812 allows processing circuitry 800 to communicate with Network 814, to which one or more other computer systems are connected. Network Interface 812 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 800 is configured to receive information through I/O Interface 810. The information received through I/O Interface 810 includes one or more of instructions, data, design rules, libraries of cells, and/or other parameters for processing by Processor 802. The information is transferred to Processor 802 via Bus 808. Processing circuitry 800 is configured to receive information related to a User Interface (UI) through I/O Interface 810. The information is stored in Non-Transitory, Computer-Readable Storage Medium 804 as UI 820.

In one or more embodiments, one or more Non-Transitory, Computer-Readable Storage Medium 804 having stored thereon Instructions 806 (in compressed or uncompressed form) that may be used to program a computer, processor, or other electronic device) to perform processes or methods described herein. The one or more Non-Transitory, Computer-Readable Storage Medium 804 includes one or more of an electronic storage medium, a magnetic storage medium, an optical storage medium, a quantum storage medium, or the like.

For example, the Non-Transitory, Computer-Readable Storage Medium 804 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 804 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 804 stores Instructions 806 configured to cause Processor 802 to perform at least a portion of the processes and/or methods for providing user interface control via a touch screen in a vehicle. In one or more embodiments, Non-Transitory, Computer-Readable Storage Medium 804 also stores information, such as algorithm which facilitates performing at least a portion of the processes and/or methods for providing user interface control via a touch screen in a vehicle.

Accordingly, in at least one embodiment, Processor 802 executes Instructions 806 stored on the one or more Non-Transitory, Computer-Readable Storage Medium 804 to implement a Cockpit Domain Controller 830. Processor 802 is configured to cause Cockpit Domain Controller 830 to store and recognize multiple finger gestures. Processor 802 uses Finger Function Control Interface 834 for a user to set one or more Multiple Finger Gesture Configurations 840 and to cause Cockpit Domain Controller 830 translates to Functions/Operations Mapped to Multiple Finger Gestures 842. Processor 802 uses Finger Function Control Interface 834 to register a relationship between a predetermined function/operation control and a predetermined multiple finger gesture using at least two fingers pressed on a touch screen for a predetermined time. Processor 802 uses Finger Function Control Interface 834 to present candidates for the predetermined multiple finger gesture operations to the driver. Cockpit Domain Controller 830 outputs the operation performed on the At least One Touch Screen Display 880 at User Interface 882, e.g., Left Touch Screen 884 and Right Touch Screen 894.

Processor 802 also implements a Heads Up Display (HUD) 896 and an Instrument Cluster (IC) 898. Left Touch Screen 884 and Right Touch Screen 894 include an Input Detection Interface 886 configured to detect a predetermined multiple finger operation by a driver of the vehicle that is sent to Cockpit Domain Controller 830. Processor 802 implements an Output Generation 832 to generate a predetermined output corresponding to multiple finger gesture operations. The output from multiple finger gesture operations is predetermined by Output Generation 832, and provides an operation other than a single finger touch gesture. The Cockpit Domain Controller 830 allows the driver to safely operate an I/O device using multiple finger gestures without reducing attention of the driver while driving the vehicle. User Interface 820 shows Multiple Finger Gestures Operations 822 implemented by Processor 802.

A driver is able to initiate a Finger Function Control Interface 834 through Touch Screen User Interface Controls 836 provided by Cockpit Domain Controller 830 to execute Functions/Operations Mapped to Multiple Finger Gestures 842 based on Multiple Finger Gesture Configurations 840. Processor uses Predetermined Finger Press Times 858 to trigger Functions/Operations Mapped to Multiple Finger Gestures 842 based on Multiple Finger Gesture Configurations 840. The Predetermined Finger Press Times 858 are also configured using Finger Function Control Interface 834.

Touch Screen User Interface Controls 836 supports operations of the at least one Touch Screen 880. A driver is able to use Input Detection Interface 886 of at least Left Touch Screen 884 and Right Touch Screen 894 to access the Finger Function Control Interface 834 to assign a multiple finger gesture to a function control.

Processor 802 configures Finger Function Control Interface 834 to map a long push using two or more fingers applied to Left Touch Screen 884 and Right Touch Screen 894, e.g., for several seconds, to associate a function control with the long touch using two or more fingers. Processor 802 provides Finger Function Control Interface 834 the ability for a user to configure the period of long push, and to assign an action to a function control. Processor 802 provides Finger Function Control Interface 834 the ability to configure double touches using multiple fingers within a few, and to associate such double touches with a function control. Processor 802 provides Finger Function Control Interface 834 the ability to configure the period of double touches, and is able to assign an action to a function control.

Processor 802 causes Touch Screen User Interface Controls 836 to present the Finger Function Control Interface 834 to enable the user to configure candidates of the multiple finger gesture operations. Generating the predetermined output includes displaying the Finger Function Control Interface 834 by Processor 802 on the touch screen of the output device for enabling multiple finger command gestures. Zoom-In/Zoom-Out Interface 888 of Left Touch Screen 884 and Right Touch Screen 894 enables a user to enlarge/zoom-in by a pinch-out operation on one or more of Left Touch Screen 884 and Right Touch Screen 894, and to reduce/zoom-out by a pinch-in operation on one or more of Left Touch Screen 884 and Right Touch Screen 894. If the screen is displayed on the Instrument Panel 898, the above pinch-out and pinch-in functions are able to be disabled by Processor 802.

Processor 802 uses Multiple Finger Gesture Detection Enable/Disable Rules 850 so that the At Least One Touch Screen Display 880 is able to be disabled for displaying visual interactions when the vehicle is moving. In response to the vehicle stopping, Processor restores the visual interactions to the At Least One Touch Screen Display 880 and at that point the multiple finger command gestures are able to be disabled or to not be recognized.

Processor 802 is also able to use Steering Wheel Sensor Data 852 to determine the position of the steering wheel and thus detect that the steering wheel is being turned beyond a predetermined amount. The operation of the Multiple Finger Gesture Configurations 840 is invalid when the driver turns a steering wheel by more than a predetermined angle. Thus, the driver is able to be prevented from using Multiple Finger Gesture Configurations 840 to execute Functions/Operations Mapped to Multiple Finger Gestures 842 in an unsafe manner. Processor 802 determines that a slight movement does not result in Multiple Finger Gesture Configurations 840 being a dangerous maneuver. Processor 802 is also able to use Camera Road Angle Data 854 to determine an angle of the vehicle relative to the road to render a Multiple Finger Gesture Configurations 840 as being invalid. Processor 802 uses Camera/Sensor Enable/Disable Actions 856 to make such decisions.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing a multiple finger gesture user interface control in a vehicle, comprising:
    accessing a Finger Function Control Interface on a touch screen to assign at least one action of a predetermined function control to a predetermined multiple finger gesture on the touch screen, wherein a period of push with multiple fingers, and assignment of the at least one action to a function control are configured using the Finger Function Control Interface;
    registering a relationship between the predetermined function control and the predetermined multiple finger gesture using at least two fingers pressed on the touch screen of a vehicle for a predetermined time set by the period of push;
    detecting the predetermined multiple finger gesture using the at least two fingers pressed on the touch screen for the predetermined time;
    in response to determining the vehicle is not moving, disabling the predetermined function control associated with the predetermined multiple finger gesture; and
    in response to determining the vehicle is moving, enabling the predetermined function control associated with the predetermined multiple finger gesture and generating the predetermined function control corresponding to the predetermined multiple finger gesture.

2. The method of claim 1, wherein the registering the relationship between the predetermined function control and the predetermined multiple finger gesture using at least two fingers pressed on the touch screen for the predetermined time further includes assigning the at least one action to the predetermined multiple finger gesture, and configuring the predetermined time for the at least two fingers to be pressed on the touch screen to trigger the at least one action.

3. The method of claim 1, wherein the detecting the predetermined multiple finger gesture includes detecting a push using multiple fingers for the predetermined time combined with a predetermined motion.

4. The method of claim 1, wherein the detecting the predetermined multiple finger gesture includes detecting at least one of a push using two fingers for the predetermined time, a push by three fingers for the predetermined time, a push by four fingers for the predetermined time, or a push by five fingers for the predetermined time.

5. The method of claim 1, wherein the detecting the predetermined multiple finger gesture using two or more fingers pressed on the touch screen for the predetermined time includes detecting a double touch using multiple fingers within a time limit.

6. The method of claim 1, wherein the detecting the predetermined multiple finger gesture using two or more fingers pressed on the touch screen for the predetermined time includes rendering a predetermined output corresponding to the predetermined multiple finger gesture invalid in response to at least one of a turning of a steering wheel or a detecting an angle of the vehicle exceeding a predetermined angle on a road.

7. The method of claim 1, further comprising, in response to determining the vehicle is moving, halting visual interaction on the touch screen and enabling detection of the predetermined multiple finger gesture on the touch screen for the predetermined time.

8. A device for providing a multiple finger gesture user interface control in a vehicle, comprising:
    a memory storing computer-readable instructions; and
    a processor connected to the memory, wherein the processor is configured to execute the computer-readable instructions to perform operations to:
        access a Finger Function Control Interface on a touch screen to assign at least one action of a predetermined function control to a predetermined multiple finger gesture on the touch screen, wherein a period of push with multiple fingers, and assignment of the at least one action to a function control are configured using the Finger Function Control Interface;
        register a relationship between the predetermined function control and the predetermined multiple finger gesture using at least two fingers pressed on the touch screen of a vehicle for a predetermined time set by the period of push;
        detect the predetermined multiple finger gesture using the at least two fingers pressed on the touch screen for the predetermined time;
        in response to determining the vehicle is not moving, disable the predetermined function control associated with the predetermined multiple finger gesture; and
        in response to determining the vehicle is moving, enable the predetermined function control associated with the predetermined multiple finger gesture; and generate a predetermined function control corresponding to the predetermined multiple finger gesture.

9. The device of claim 8, wherein the processor is further configured to register the relationship between the predetermined function control and the predetermined multiple finger gesture using at least two fingers pressed on the touch screen for the predetermined time by assigning at least one action to the predetermined multiple finger gesture, and configuring the predetermined time for the at least two fingers to be pressed on the touch screen to trigger the at least one action.

10. The device of claim 8, wherein the processor is further configured to detect the predetermined multiple finger gesture by detecting a push using multiple fingers for the predetermined time combined with a predetermined motion.

11. The device of claim 8, wherein the processor is further configured to detect the predetermined multiple finger gesture by detecting at least one of a push using two fingers for the predetermined time, a push by three fingers for the predetermined time, a push by four fingers for the predetermined time, or a push by five fingers for the predetermined time.

12. The device of claim 8, wherein the processor is further configured to detect the predetermined multiple finger gesture using two or more fingers pressed on the touch screen for the predetermined time by detecting a double touch using multiple fingers within a time limit.

13. The device of claim 8, wherein the processor is further configured to detect the predetermined multiple finger gesture using two or more fingers pressed on the touch screen for the predetermined time by rendering the predetermined output corresponding to the predetermined multiple finger gesture invalid in response to at least one of a turning of a steering wheel or detecting an angle of the vehicle exceeding a predetermined angle on a road.

14. The device of claim 8, wherein the processor is further configured to, in response to determining the vehicle is moving, halt visual interaction on the touch screen and enable detection of the predetermined multiple finger gesture on the touch screen for the predetermined time.

15. A non-transitory computer-readable media having computer-readable instructions stored thereon, which when executed by a processor causes the processor to perform operations comprising:
  accessing a Finger Function Control Interface on a touch screen to assign at least one action of a predetermined function control to a predetermined multiple finger gesture on the touch screen, wherein a period of push with multiple fingers, and assignment of the at least one action to a function control are configured using the Finger Function Control Interface;
  registering a relationship between the predetermined function control and the predetermined multiple finger gesture using at least two fingers pressed on the touch screen for a predetermined time set by the period of push;
  detecting the predetermined multiple finger gesture using the at least two fingers pressed on the touch screen for the predetermined time;
  in response to determining the vehicle is not moving, disabling the predetermined function control associated with the predetermined multiple finger gesture; and
  in response to determining the vehicle is moving, enabling the predetermined function control associated with the predetermined multiple finger gesture and generating the predetermined function control corresponding to the predetermined multiple finger gesture.

16. The non-transitory computer-readable media of claim 15, wherein the registering the relationship between the predetermined function control and the predetermined multiple finger gesture using at least two fingers pressed on the touch screen for the predetermined time further includes assigning at least one action to the predetermined multiple finger gesture, and configuring the predetermined time for the at least two fingers to be pressed on the touch screen to trigger the at least one action.

17. The non-transitory computer-readable media of claim 15, wherein the detecting the predetermined multiple finger gesture includes detecting a push using multiple fingers for the predetermined time combined with a predetermined motion.

18. The non-transitory computer-readable media of claim 15, wherein the detecting the predetermined multiple finger gesture includes detecting at least one of a push using two fingers for the predetermined time, a push by three fingers for the predetermined time, a push by four fingers for the predetermined time, or a push by five fingers for the predetermined time.

19. The non-transitory computer-readable media of claim 15, wherein the detecting the predetermined multiple finger gesture using two or more fingers pressed on the touch screen for the predetermined time includes detecting a double touch using multiple fingers within a time limit.

20. The non-transitory computer-readable media of claim 15, wherein the detecting the predetermined multiple finger gesture using two or more fingers pressed on the touch screen for the predetermined time includes at least one of:
  in response to at least one of a turning of a steering wheel or detecting an angle of the vehicle exceeding a predetermined angle on a road, rendering the predetermined output corresponding to the predetermined multiple finger gesture invalid; or
  in response to determining the vehicle is moving, halting visual interaction on the touch screen and enabling detection of the predetermined multiple finger gesture on the touch screen for the predetermined time.

\* \* \* \* \*